Aug. 1, 1939.    H. BAEHR ET AL    2,168,150
DEGASIFICATION OF ALKALINE LIQUIDS LADEN WITH HYDROGEN SULPHIDE
Filed June 12, 1937
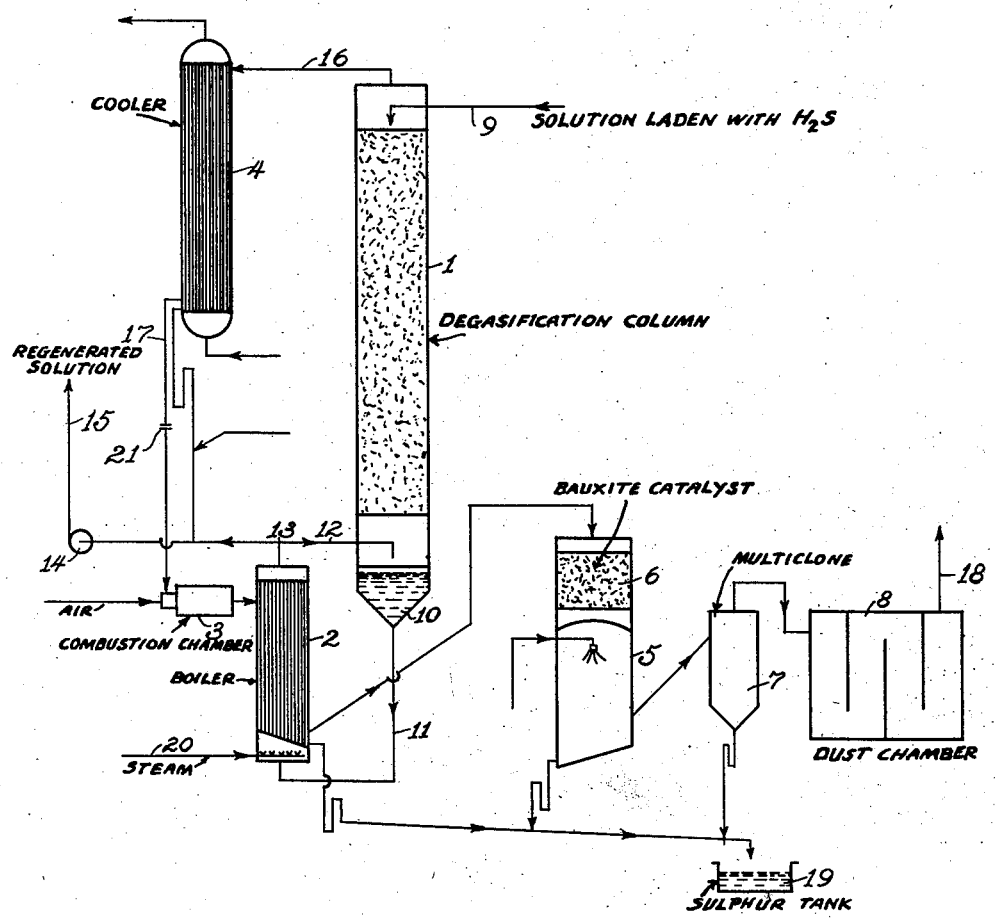
Hans Baehr
Karl Braus
INVENTORS
BY
THEIR ATTORNEYS Patented Aug. 1, 1939

2,168,150

UNITED STATES PATENT OFFICE 2,168,150

DEGASIFICATION OF ALKALINE LIQUIDS LADEN WITH HYDROGEN SULPHIDE

Hans Baehr and Karl Braus, Leuna, Germany, assignors to I. G. Farbenindustrie Aktiengesellschaft, Frankfort-on-the-Main, Germany Application June 12, 1937, Serial No. 147,895
In Germany June 24, 1936

3 Claims. (Cl. 23—177)

The present invention relates to the degasification of alkaline liquids laden with hydrogen sulphide for the purpose of expelling the latter therefrom.

For the desulphurization of gases, those processes are always preferred in which the removal of the hydrogen sulphide is effected with the aid of alkaline liquids which absorb hydrogen sulphide in the cold and which give it up again when heated. As such washing liquids there may be mentioned for example aqueous solutions of alkali metal carbonates, as for example of potassium carbonate, or solutions of strong organic bases, as for example of alkylol amines, such as for instance mono- or tri-ethanol amine, or solutions of salts of strong inorganic or organic bases with weak organic acids, in particular amino acids, such as for example glycocoll potassium salt or alanine sodium salt.

While the washing out of the gases may be effected in a simple manner by the said processes, the regeneration of the washing liquids requires a large expenditure of heat which is supplied as a rule in the form of steam or hot combustion gases.

On the other hand, by the degasification of the washing liquids, the hydrogen sulphide is set free in a concentrated form. By reason of its troublesome odour and its very poisonous nature, it may not be allowed to escape directly into the atmosphere, but usually rather extensive plant is necessary for the further working up and these by reason of the danger of poisoning must be constructed especially carefully and must be continually supervised and are therefore very expensive.

We have now found that the said difficulties may be avoided by burning the effluent hydrogen sulphide in such manner that the heat of reaction thus produced is used for the degasification of the washing liquid laden with hydrogen sulphide. In this way extensive pipes and collecting containers and the like, which have hitherto been necessary for the working up of hydrogen sulphide, are dispensed with and moreover at least a large part of the expenditure of steam or hot combustion gases hitherto necessary for the regeneration of the washing liquids is saved, so that the economy of the process is thus increased quite considerably.

The apparatus for the regeneration of the washing liquid is usually composed of a degasification column through which the liquid to be regenerated flows downwards, and a boiler, arranged in the lower part of the column or beside the same, in which the liquid is heated indirectly with hot gas or steam and which is in direct connection with the column. For carrying out the process according to this invention, the usual heating of the boiler with steam or hot gases may for example be dispensed with and instead the hydrogen sulphide expelled in the column, preferably after a cooling, is led together with a gas containing oxygen, such as oxygen or air, into the boiler as a heating gas.

Whether the heat produced by the combustion is sufficient for the driving out of the hydrogen sulphide, depends on the amount of hydrogen sulphide available. For example if only hydrogen sulphide is removed from the gas to be purified and if the absorptive power of the washing liquid is great, the combustion of the hydrogen sulphide, set free during the degasification, to form sulphur dioxide not only yields the heat necessary for the regeneration of the washing liquid but also an excess of heat which may be allowed to go to waste or may be rendered useful in a known manner. For example the excess heat may be led away by allowing a stronger evaporation of the washing liquid to take place, the solution then being correspondingly diluted by the addition of the cooled condensate or other water.

The process may also be used in cases when the hydrogen sulphide absorbed by the washing liquid is insufficient to yield by combustion the amount of heat necessary for the regeneration. The amount of heat lacking is then supplied by the additional combustion of other gases or by the introduction of suitable amounts of steam.

The process according to this invention has the further advantage that practically the whole of the hydrogen sulphide is converted into sulphur and/or sulphur dioxide which may readily be recovered and if desired worked up into other products.

For example if it is desired to obtain sulphur, the hydrogen sulphide is burned with the amount of air necessary for the formation of sulphur. From about 70 to 80 per cent of the hydrogen sulphide is converted into sulphur in the boiler and may readily be recovered. By working in such manner that the combustion gases leave the boiler at a temperature of less than 200° C., a large part of the sulphur separates in liquid form. The remainder of the sulphur may be precipitated in suitable separators, as for example chambers filled with Raschig rings, so-called Multiclones (i. e. apparatus consisting of a plurality of cyclones arranged in parallel and enclosed in a common housing), or electrofilters.

If the conversion obtained is unsatisfactory, catalysts, as for example bauxite, may be arranged in the path of the combustion gases in the boiler or behind the same corresponding to the procedure in Claus' furnaces. In this way, especially when low temperatures are maintained for the catalytic conversion, an almost complete conversion of the hydrogen sulphide and sulphur dioxide still present in the gases into sulphur is effected. The arrangement of catalysts in the path of the gas in the boiler is necessary when the hydrogen sulphide is so strongly diluted, for example by carbon dioxide, that it can no longer be burned with a free flame but only catalytically. When the heating of the boiler is carried out in known manner while continuously circulating a part of the combustion gas in order to avoid too strong an overheating at the gas inlet, the conversion of the sulphur and its recovery naturally need only be carried out in that part of the gas which is withdrawn from circulation corresponding to the amount of fresh gas supplied.

When instead of recovering sulphur, it is desired to work up the hydrogen sulphide into sulphur dioxide or sulphuric acid, there is employed in the combustion such an excess of oxygen or gas containing oxygen, such as air, that the combustion gases after leaving the boiler contain the sulphur in the form of sulphur dioxide and may be supplied direct to the manufacture of sulphuric acid. It should be noted, however, that in this case the combustion gases always contain small amounts of sulphur trioxide which, at too low temperatures, as for example in the neighbourhood of 100° C., may readily attack and destroy the apparatus materials, as for example the boiler tubes. This attack is avoided with certainty by carrying out the degasification of the washing liquid under increased pressure; in this case the solutions boil at correspondingly higher temperatures and the walls of the boiler are also at higher temperatures. Then it is even possible to provide within the boiler or adjacent thereto layers of catalyst by which the sulphur dioxide is converted directly into sulphur trioxide which then may be recovered as concentrated sulphuric acid by maintaining a suitable temperature.

When burning the hydrogen sulphide to form sulphur, the carrying out of the degasification under pressure also offers an advantage because a boiling temperature of more than 119° C. prevents the deposition of solid sulphur on the heating tubes of the boiler.

In any case it is advantageous that the pressure in the degasification column should at least be such that the hydrogen sulphide set free is moved not only through the gas cooler but also through the combustion chamber and boiler and all the apparatus arranged behind the same solely by the prevailing pressure.

In the case of all desulphurizing processes which work with washing agents having an alkaline reaction, the process according to this invention reduces to a minimum the great sources of danger offered by the hydrogen sulphide, because by means of the process the hydrogen sulphide is disposed of in the shortest way by working up into the desired products without the aid of gasometers, blowers and additional plant. Furthermore the new method of working provides a considerable simplification of the process because the greater part of the plant otherwise necessary for the further working up of the hydrogen sulphide is dispensed with, the heat derived from the reactions used in the further working up of the hydrogen sulphide is used for the regeneration of the washing liquid and the heat otherwise used for the regeneration in the form of steam or hot gases is saved.

The following example, given with reference to the accompanying drawing which shows diagrammatically an arrangement of apparatus suitable for carrying out the process according to this invention, will further illustrate the nature of this invention but the invention is restricted neither to this example nor to the particular arrangement shown.

*Example*

A 30 per cent solution of glycocoll sodium salt is used for the desulphurization of a waste gas from the destructive hydrogenation of coal. During each hour, 10 cubic meters of the solution are used, 300 cubic meters of hydrogen sulphide being absorbed per hour. The solution flows in a continuous cycle through a washing tower (not shown in the drawing) and a degasification apparatus. The degasification apparatus comprises a degasification column 1, a boiler 2, a combustion chamber 3, a gas cooler 4, a chamber 5 having a layer of catalyst 6, a Multiclone apparatus 7 and a dust chamber 8.

The solution laden with hydrogen sulphide is introduced at 9 into the upper part of the degasification column 1, flows downwards through the same and passes by way of a column sump 10 through a pipe 11 into the boiler 2. In this the solution is boiled; the solution is moved by thermosyphon action in a powerful cycle through the boiler 2, a pipe 12, the column sump 10 and the pipe 11. An amount of regenerated solution equal to the amount of saturated solution introduced at 9 is branched off from the said cycle at 13 and forced back into the washing tower (not shown) by means of a pump 14 through a pipe 15.

Under the influence of the heat and the steam ascending in the degasification column 1 and finally by the boiling, the hydrogen sulphide is expelled from the solution; mixed with steam, it leaves the column at the top through a pipe 16. After cooling in a gas cooler 4, it is supplied through a pipe 17 to the combustion chamber 3 in which it is burned with 720 cubic meters of air per hour. The hot combustion gases flow downwards through the boiler 2 and leave it at a temperature of from about 220° to 260° C. The gas, which at this point has already been converted into sulphur to the extent of more than 70 per cent, is then led through the bauxite catalyst 6 under the influence of which the hydrogen sulphide and sulphur dioxide present in the gas are caused to react to such an extent that about 95 per cent of the hydrogen sulphide originally introduced into the combustion chamber are converted into sulphur. The gas, which has been heated by about 80° C. in the catalyst, is cooled to about 130° C. in the lower part of the chamber 5 by spraying in atomized water, the greater part of the sulphur formed thus being separated. For the precipitation of the residual sulphur, the gas is then led through the Multiclone apparatus 7 and the dust chamber 8. In the dust chamber 8, the hydrogen sulphide still present is reacted with the sulphur dioxide to such an extent that the gas contains at the end of this chamber only such a small amount of sulphur that it may be allowed to escape into the atmosphere through the pipe 18 without fear. The smaller amounts of sulphur which collect in the boiler and also the amounts of sulphur which collect in the cooling chamber below the catalyst 6 and in the Multiclone 7 are continuously withdrawn in the liquid state by syphons and collected in a collecting vessel 19.

In order to maintain the concentration of the washing liquid, the whole of the water separated in the hydrogen sulphide cooler 4, if necessary with the addition of further amounts of water, is returned to the solution.

When starting up the plant, any heating gas may be burned in the combustion chamber 3 or the solution in the boiler 2 may be heated by steam through the pipe 20 until the amount of hydrogen sulphide expelled has reached the necessary value. After that the regeneration of the solution proceeds automatically with the continuous recovery of sulphur. It is merely necessary to observe the amount of hydrogen sulphide set free with the aid of the measuring device 21 and to regulate the amount of air supplied to the combustion chamber accordingly, so that there are always 2.4 parts by volume of air for each part by volume of hydrogen sulphide introduced into the combustion chamber.

What we claim is:

1. A continuous process of degasifying an alkaline liquid capable of absorbing hydrogen sulphide in the cold and giving it off on heating, which liquid is laden with hydrogen sulphide, which process comprises burning the hydrogen sulphide expelled from said liquid with a gas comprising elementary oxygen at least to sulphur and directly supplying the heat thus disengaged to a further amount of said liquid to be degasified, the bulk of the heat for said degasification being supplied by the hot gases of combustion of said hydrogen sulphide.

2. A continuous process of degasifying an alkaline liquid capable of absorbing hydrogen sulphide in the cold and giving it off on heating, which liquid is laden with hydrogen sulphide, which process comprises burning the hydrogen sulphide expelled from said liquid with an amount of a gas comprising elementary oxygen sufficient to convert the hydrogen sulphide into sulphur, but insufficient to convert the whole of it into sulphur dioxide and directly supplying the heat thus disengaged to a further amount of said liquid to be degasified, the bulk of the heat for said degasification being supplied by the hot gases of combustion of said hydrogen sulphide.

3. The process of degasifying an alkaline liquid capable of absorbing hydrogen sulphide in the cold and giving it off on heating, which liquid is laden with hydrogen sulphide, which process comprises burning the hydrogen sulphide expelled from said liquid with a gas comprising elementary oxygen at least to sulphur and supplying the heat thus disengaged to a further amount of said liquid to be degasified, the said liquid being kept under a superatmospheric pressure sufficiently high to keep its boiling point above 119° C.

HANS BAEHR.
KARL BRAUS.